United States Patent [19]

Pittella

[11] Patent Number: 5,271,591

[45] Date of Patent: Dec. 21, 1993

[54] BRACKET FOR CANTILEVER MOUNTING OF FLAT SHELF PLATES

[76] Inventor: Joseph A. Pittella, 42 Riviera Dr., San Remo, N.Y. 11754

[21] Appl. No.: 929,407

[22] Filed: Aug. 11, 1992

[51] Int. Cl.⁵ .............................................. A47G 29/02
[52] U.S. Cl. ...................................... 248/250; 248/398
[58] Field of Search ............... 248/235, 239, 241, 246, 248/250, 298, 313, 316.3; 108/157

[56] References Cited

U.S. PATENT DOCUMENTS

| | | | |
|---|---|---|---|
| 4,733,843 | 3/1988 | Bessinger | 248/250 |
| 4,736,919 | 4/1988 | Bessinger | 248/250 |
| 4,738,426 | 4/1988 | Bessinger | 248/250 |
| 4,856,746 | 8/1989 | Wrobel et al. | 248/239 X |

*Primary Examiner*—Ramon O. Ramirez
*Attorney, Agent, or Firm*—Darby & Darby

[57] ABSTRACT

A bracket for cantilever mounting of flat shelf plates has a vertical member with upper and lower spaced projections. A pressure housing is mounted on the underside of the upper projection, and a pressure plate is movably mounted in such underside. Pressure is applied to the pressure plate by a ball bearing mounted in the pressure housing for up and down movement. A set screw is mounted in the pressure housing and positioned to apply downward pressure on the ball bearing and on the pressure plate, whereby a flat shelf member may be inserted between the upper and lower projections and locked in place with the set screw to provide cantilever support at one end of the shelf member.

18 Claims, 1 Drawing Sheet

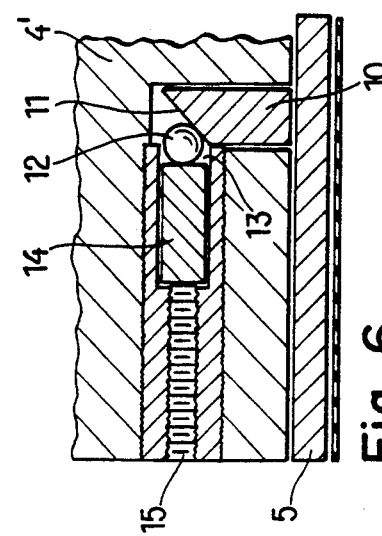
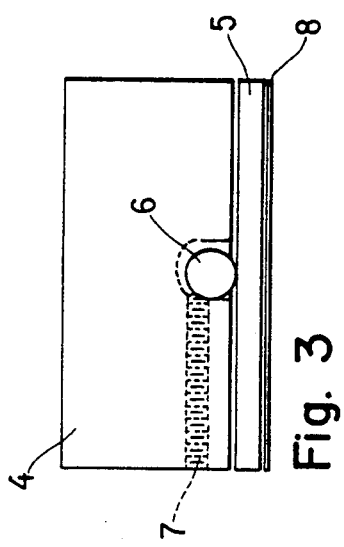
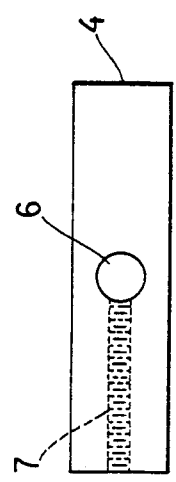
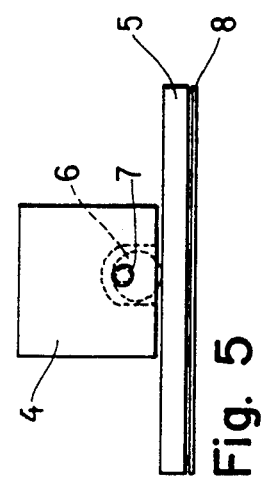
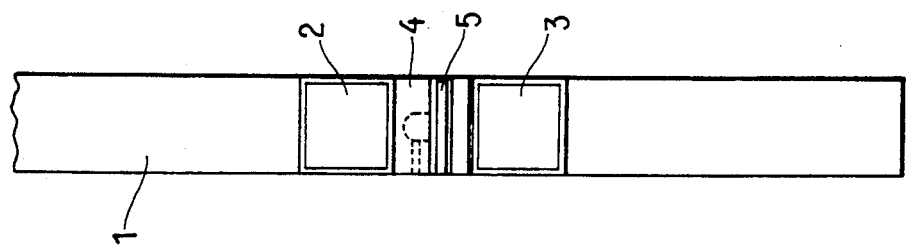
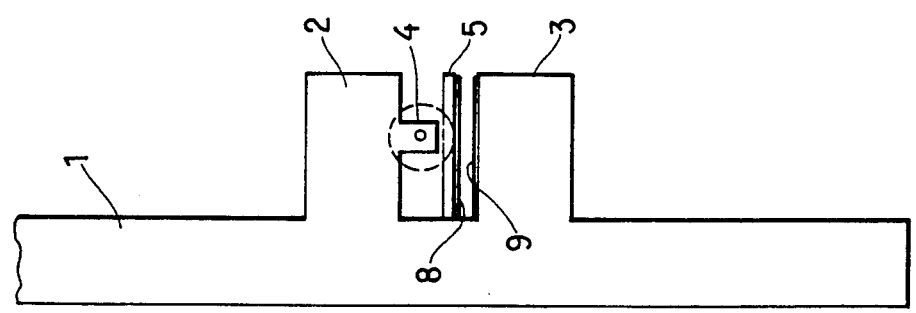

BRACKET FOR CANTILEVER MOUNTING OF FLAT SHELF PLATES

TECHNICAL FIELD

This invention relates to cantilever mounting of shelf plates and more particularly to a wall mounted bracket for providing cantilever mounting of shelves.

BACKGROUND

In conventional shelves, for instance, in bookcases, the shelves are supported at each end with vertical support members so that the assembly must be manufactured, transported and installed, which is difficult and expensive because these assemblies are generally heavy and bulky.

PRIOR ART

Applicant does not know of any prior art.

THE INVENTION

The present invention eliminates the need for supports for shelf members, for instance, in bookcases, and provides a wall supported bracket which supports the shelving in the cantilever fashion.

This minimizes the number of vertical support members required and provides a means to build decorative spacious shelf assemblies quickly on the site of use. This eliminates the manufacture, transportation and installation of bulky and heavy assemblies.

OBJECTS OF THE INVENTION

A principal object of the invention is to provide a new and improved bracket for mounting shelves either singly or in bookcase style.

Another object of the invention is to provide means for constructing shelves such as bookcases on the site of use that the parts can be easily transported and installed, thereby eliminating the manufacture, transporting and installing of bulky and heavy assemblies.

Another object of the invention is to provide a new bracket for cantilever mounting of flat shelf plates comprising: a vertical member, upper and lower spaced projections on the vertical member, a pressure housing on the underside of the upper projection, a pressure plate movably mounted in the underside of the upper projection, means to apply pressure to the pressure plate comprising a ball bearing mounted in the pressure housing for up and down movement in contact with the pressure plate, and a set screw mounted in the pressure housing and positioned to apply downward pressure on the ball bearing and on the pressure plate, whereby a flat shelf member may be inserted between the upper and lower projections and locked in place with the set screw, to provide cantilever support at one end of the shelf member.

These and other objects of the invention will be apparent from the following specification and drawings.

BRIEF DESCRIPTION OF THE DRAWINGS

FIG. 1 is a side view of an embodiment of the invention.

FIG. 2 is a front view of FIG. 1.

FIG. 3 is an enlarged side view of the pressure housing assembly of FIG. 1.

FIG. 4 is a bottom view of FIG. 3.

FIG. 5 is a front view of FIG. 3.

FIG. 6 is an enlarged detail sectional view of a modification of the invention.

BEST MODE OF THE INVENTION

Referring to the Figures, FIG. 1 shows a side view and FIG. 2 a front view of a first embodiment of the invention comprising a vertical member 1, and upper and lower spaced projections 2, 3. A pressure plate housing 4 is mounted on the underside of the upper projection 2. The pressure housing includes a pressure plate 5 which is movably mounted in the pressure housing 4.

Pressure is applied to the pressure plate 5 by a ball bearing 6 which is mounted in a recess in the pressure plate housing 4. A set screw 7 is mounted in the housing 4 so as to exert downward pressure on the ball bearing 6 and the pressure plate 5. A rubber pad 8 is mounted on the underside of the pressure plate 5. The lower projection 3 also has a friction plate 9, for instance, of rubber. The shelf member to be mounted, not shown, is inserted between the upper and lower projections intermediate the rubber pads 8 and 9. The set screw is then tightened to clamp the shelf member in cantilever fashion.

The vertical member 1 may be constructed with a number of upper and lower projection pairs, for instance, if it is desired to mount a series of shelves as in a bookcase.

FIG. 6 shows an enlarged detail view of a modification of the invention. In this modification, a rod-shaped or bar-shaped pressure pin 10 is mounted in the housing 4'. The pressure pin 10 has an inclined upper surface 11, and ball bearing 12 is mounted in the recess 13. Pressure is applied to the ball bearing 12 by rod-shaped or bar-shaped pin 14, which is actuated by set screw 15. The invention can mount cabinets, racks, and other items.

It is claimed:

1. Bracket for cantilever mounting of articles such as shelves and cabinets comprising:
    a support having a pair of spaced projections, and
    means for clamping part of an article between said projections, said clamping means including,
    a pressure element receivable between said projections for movement in a first direction from one of said projections towards the other of said projections, and
    means on said one projection for moving said pressure element in said first direction, said moving means comprising a first biasing element having a component of movement in said first direction so as to urge said pressure element along said first direction and a second biasing element for shifting said first biasing element, said second biasing element being movable in a second direction unparallel to said first direction.

2. The bracket of claim 1, wherein said pressure element comprises a substantially flat plate.

3. The bracket of claim 1, wherein said projections are at least approximately coextensive.

4. The bracket of claim 3, wherein said pressure element comprises a substantially flat plate which is at least approximately coextensive with said projections.

5. The bracket of claim 1, wherein said first biasing element has an arcuate peripheral surface portion.

6. The bracket of claim 5, wherein said first biasing element is substantially spherical.

7. The bracket of claim 1, wherein said second biasing element is threaded.

8. The bracket of claim 7, wherein said second biasing element comprises a set screw.

9. The bracket of claim 1, wherein said moving means further comprises a third biasing element interposable between said first biasing element and said pressure element for movement in said first direction.

10. The bracket of claim 9, wherein said third biasing element is rod-shaped or bar-shaped and is arranged to extend along said first direction.

11. The bracket of claim 9, wherein said moving means further comprises a fourth biasing element interposable between said first and second biasing elements for movement in said second direction.

12. The bracket of claim 11, wherein said fourth biasing element is rod-shaped or bar-shaped and is arranged to extend along said second direction.

13. The bracket of claim 11, wherein said second direction is at least approximately perpendicular to said first direction.

14. The bracket of claim 11, wherein said one projection is provided with a housing and said biasing elements are mounted on said housing.

15. Bracket for cantilever mounting of flat plates comprising:
   a vertical member,
   upper and lower spaced projections on the vertical member,
   a pressure housing on the underside of the upper projection,
   a pressure plate movably mounted in the underside of the upper projection,
   a pressure pin mounted for up-and-down movement in the pressure housing to apply pressure to the pressure plate,
   whereby a flat member may be inserted between the upper and lower projections and locked in place to provide cantilever support at one end of the flat member.

16. Bracket for cantilever mounting of flat plates comprising:
   a vertical member,
   upper and lower spaced projections on the vertical member,
   a pressure housing on the underside of the upper projection,
   a pressure plate movably mounted in the underside of the upper projection,
   a ball bearing mounted in the pressure housing for up-and-down movement in contact with the pressure plate,
   a set screw mounted in the pressure housing and positioned to apply downward pressure on the ball bearing and on the pressure plate,
   whereby a flat member may be inserted between the upper and lower projections and locked in place with the set screw to provide cantilever support at one end of the flat member.

17. A bracket as in claim 16, wherein the flat member is a shelf.

18. A bracket as in claim 16 wherein the flat member is a support for a cabinet.

* * * * *